Jan. 12, 1971 N. G. E. STEMME 3,555,528

HEAD CONSTRUCTION FOR MULTICHANNEL MAGNETIC
RECORDING AND REPRODUCING OF DATA
Filed May 17, 1968

INVENTOR.
Nils Gustaf Erik Stemme
BY
Pierce Scheffler & Parker
Attorneys 3,555,528

HEAD CONSTRUCTION FOR MULTICHANNEL MAGNETIC RECORDING AND REPRODUCING OF DATA

Nils Gustaf Erik Stemme, Prastgardsgatan 18, Goteborg, Sweden

Filed May 17, 1968, Ser. No. 730,173
Int. Cl. G11b *5/12, 5/28, 21/26*
U.S. Cl. 340—174.1 4 Claims

ABSTRACT OF THE DISCLOSURE

A magnetic multichannel head for recording and reproducing of digital data, has separate pole systems, for tracks on a magnetic record tape or similar medium. Each pole system has a single air-gap and two opposite salient poles. The magnetic core structure of the head is common to all pole systems and consists of two similar halves each including one of the two arrays of poles and consisting of an integral body. The two halves are screwed together into firm mechanical and magnetical contact such that the two poles of each pole system face one another across a single fine air-gap. The core structure has a through bore, preferably a bore of square or hexagonal cross-section. The bore extends parallel to the two arrays of poles and is symmetrical with respect to a plane of the joint area of the two halves and with the air-gaps. The magnetic head may be clamped onto a bar or rod coaxially extending through the bore, by tightening the two halves of the core structure. The axis of the bore and, thus, of the rod (if any) is also the axis of curvature of the surface to be engaged by the magnetic tape so that said surface can be machined and polished by rotating the magnetic head around said axis with respect to a tool. Every one or every second of the individual poles is provided with a winding such that the two halves are identical and exchangeable. Said rod may serve as a fixture for machining the magnetic head and as a mounting element for the head in a magnetic recorder. The magnetic head forms a self-supporting compact unit even when not being clamped on the rod.

This invention relates to a multichannel magnetic transducer head having a row of pole systems for co-operation with separate magnetic tracks. The two poles of each pole system are facing one another and are spaced by one single intermediary unmagnetic gap and are interconnected through a ferromagnetic circuit, the centre planes of the gaps of all pole systems being coplanar.

For transverse recording on a record medium it has been proposed in the U.S. specification 3,164,682 to use a multichannel prealigned recording head comprising three core sections each made of an integral piece of a selected magnetic material. Two of the three sections are provided with pole arrays and the third section is an intermediate common pole. The two arrays are staggered such that opposite poles are associated with different pole systems and do not face one another. This known magnetic transducer head is to be operated with frequencies up to many hundreds of kilocycles. If such transducer would be used for normal magnetic recording, interference between the channels would be unavoidable, and from the constructive point of view, this magnetic transducer head is not self-supporting and has to be manufactured, assembled and provided with coils in a conventional manner.

According to the present invention, the magnetic core structure comprising the magnetic circuits together with their salient poles forms a single bipartite core structure which consists of two halves by being divided in two equal halves through the centre plane of the unmagnetic gaps of the pole systems, each half comprising one of the two arrays of poles and consisting of an integral piece of magnetic material. This magnetic core structure is provided with a through-bore extending parallel to the arrays of poles, the axis of the bore being located in said centre plane and the cross-sectional area of the bore being symmetrical with respect to said plane. The axis of the bore forms also the centre axis of curvature of those peripheral surfaces of the pole arrays which are provided for bodily engaging the associated magnetic tracks. The bipartite core structure consisting of the two halves comprises both all of the salient poles and all of the associated magnetic circuits. The two halves are fastened together and directly contact each other on either side of said bore such that the magnetic head forms a self-supporting unit for attachment on a support extending through the bore acting as a seat and guide for the support which may be a bar or rod such as a shaft of circular cross-section.

The two halves of the core structure may be screwed together, preferably by one or two pairs of screws, each screw extending through a smooth hole in one of the halves into a threaded hole in the other half, wherein the smooth and threaded holes of each half are symmetrically positioned such that the two halves are entirely identical and interchangeable so that only one single type of halves has to be produced and stored for the magnetic heads. Alternatively, all holes may be threaded, and the screws are, then, provided with a smooth neck of reduced diameter and of a length succeeding the length of one threaded hole. According to another alternative, all holes may be smooth if screws and nuts are used, or if rivets are used. The measure of using smooth holes alternating with threaded holes is preferred however as well as the use of two or, possibly, four screws only.

The core structure of the magnetic head according to the invention may be made of ferro-magnet material such as soft magnetic iron or a suitable alloy and is particularly useful for use in dynamic digital storage devices of digital data-processing machines such as electronic computers. The head may be produced assembled and mounted on a fixture or support in a very simple way. For turning, grinding and polishing the pole tooth surfaces which are to be engaged by the recording medium such as by a magnetic tape, the two halves of the head may be fixed onto a rod passing through the bore of the head and, then, the head and the tool may be rotated relative to one another around the axis of said rod. In the same simple way the head may be clamped onto the same rod or another similar rod for use in a magnetic recorder/reproducer. Thus apart from said screws or similar simple means and the rod, no special fixtures or mounting elements need be used when producing, assembling and mounting the magnetic head. The contact areas forming the joint plane of the two halves may be made so large that the reluctance magnetic impedance of the joint is negligible even if the mechanical and magnetic contact of the joint surfaces of the two halves is imperfect.

An embodiment of the invention is illustrated by way of example in the accompanying drawing in a considerably enlarged scale and is described below. In the drawing.

Figures 1, 2, 3:
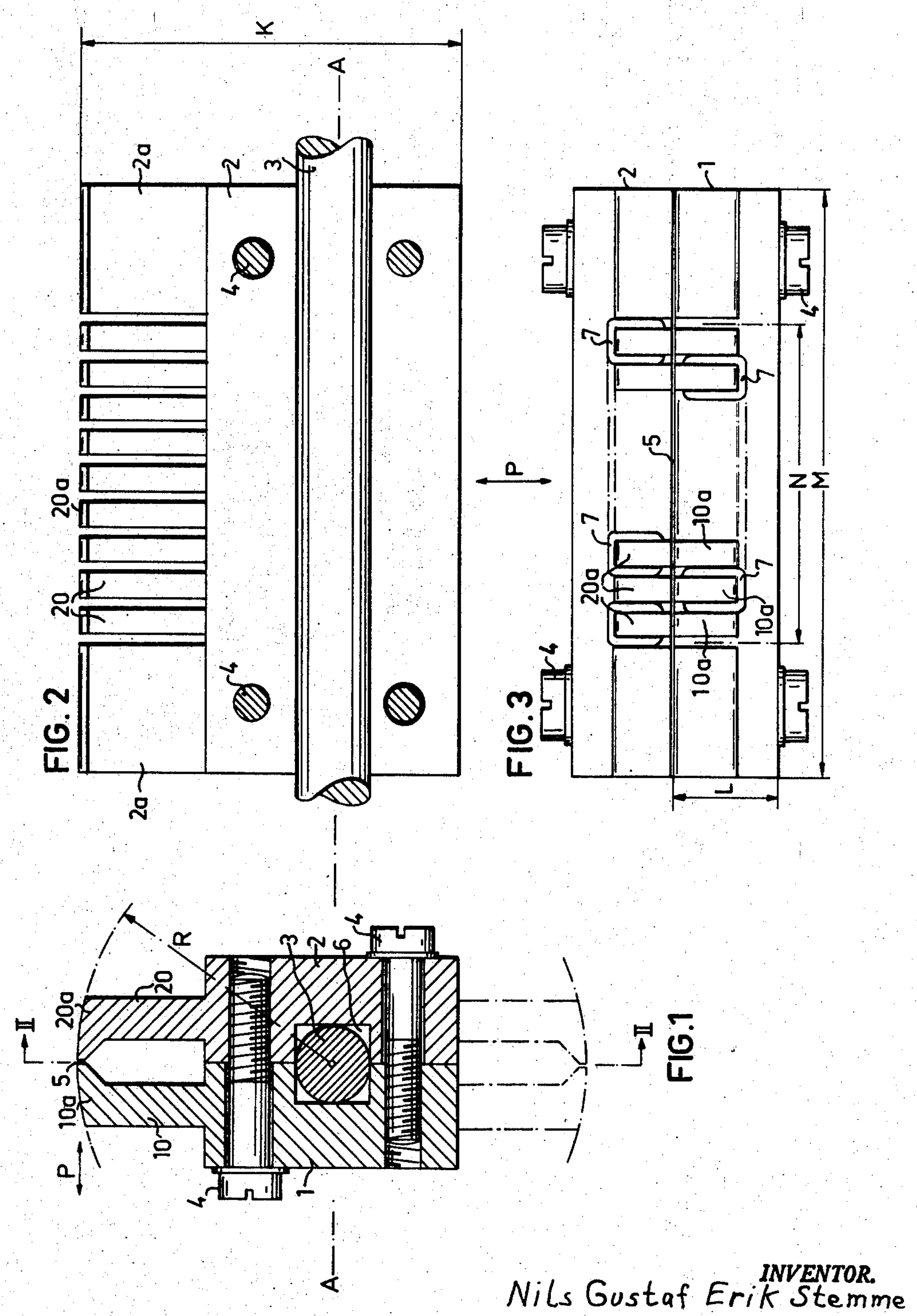
FIG. 1 is a cross-section of the core structure of a magnetic head according to the invention, i.e. a section through a plane in the direction of movement of a magnetic tape or similar magnetic recording medium.
FIG. 2 is a longitudinal section through line II—II in FIG. 1.
FIG. 3 is a perspective view of the head face as seen from the magnetic tape and from the upper side in FIGS. 1 and 2.

According to the drawing, the iron core structure or frame is composed from two identical halves 1 and 2 embracing a common circular shaft 3 and being screwed together and clamped on the shaft by four screws 4. Each of the halves is provided with an array of nine magnetic pole (pole pieces) teeth/10 and 20, respectively, for co-operation with the respective ones of nine magnetic tracks of a magnetic tape (not shown) moving in the direction of the arrow P. The teeth 10 are aligned with and facing the teeth 20 and a conventional unmagnetic intermediate layer or sheet in the pole gap of each pair of poles separates the tooth 10 from the tooth 20. The two halves 1, 2 have surfaces which engage one another and are plane and ground. The peripheral tooth surfaces 10*a* and 20*a* for engagement with the magnetic tape are machined such as turned and ground, by rotating the magnetic head, the axis of rotation being the centre line or axis of the shaft 3 so that the radius of machining (radius of turning and grinding) is the radius R in FIG. 1. The magnetic head is preferably screwed together and provided with the intermediate layer or layers 5 before being turned in a lathe. Another angular position during machining at angle of 180° with the preceding one is shown by dashed lines in FIG. 1. The curved surfaces are finished by being finely ground and polished.

The magnetic head is mounted by being clamped on the shaft 3 to be rotatable together with the shaft the projecting ends of which may be clamped independently of the clamping of the magnetic head on the shaft. The shaft 3 extends through a longitudinal bore 6 of the magnetic head, and this bore may be cylindrical and have a diameter equal to that of the shaft. For reasons of production and for other reasons, however, the bore 6 should be square as shown in FIG. 1. In every case the periphery of the shaft forms the inscribed circle of the bore. Preferably, however, two diagonally opposite corners of the square should be located on the line II—II in FIG. 1. The bore is exactly bipartite by being divided in the plane (II—II in FIG. 1) of joint and mutual contact of the two halves 1 and 2 of the magnetic core structure. Alternatively, the area of cross-section of the bore may be an equilateral hexagon such that diagonally opposite corners thereof are located in the plane of division of the bore to achieve, inter alia, that the shaft 3 does not contact the joint, i.e. any point of the plane of division, but contacts the two halves along two lines of contact on each half. The area of the bore may even be an isosceles, preferably equilaterial triangle such that the apex formed by two equal sides of the triangle is located in the plane of division of the core structure. The corners of the polygonal area of the core may be rounded to facilitate groove milling or groove shaping (planing) and to avoid an indication of fracture, i.e. a reduction of the impact resistance of the material. The sides of the polygon may be slightly curved to be either concave or convex, dependent on certain practical considerations which need not be explained in detail.

As shown in the figures of the drawing, the two halves 1 and 2 are screwed together by four screws 4, though two screws would suffice. If required, the screws may be fixed by locking means such as locking varnish or countersunk screw heads. The screws 4 keep the two halves 1 and 2 sufficiently strongly compressed to reduce the reluctance of the joint and to clamp the core structure upon the shaft 3. As the teeth 10, 20 are slightly resilient, the contact of the proper bodies of the two halves 1, 2 will be good in spite of the intermediate layer 5 provided in the air-gap. Even if a small wedge-shaped air-gap would remain between the two halves 1, 2, the reluctance would not be considerably increased because the contact area of the two halves highly exceeds the area of the individual air-gaps of the pairs of teeth. In this case the term "area" refers to the area at right angles to the flux lines. The two fastening functions may be made independent, however, for example by providing separate set screws for clamping the magnetic head on the shaft. Thus, if such set screws are not tightened, the two tightly joined halves of the core structure are not clamped on the shaft but are still clamped together. As may be seen from FIG. 1, each of the halves 1 and 2 has two diagonally opposite smooth unthreaded screw holes and two threaded holes, the four holes being symmetrically disposed. In this way, the two halves 1 and 2 are exactly identical so that only one type of halves has to be produced for magnetic heads of the shown construction. The screws 4 may be metric screws M1.7 x 8 (outer diameter 1.7 mms., length 8 mms.) and need not be tight fitting screws as the fit-up and alignment of the magnetic head is ensured by the shaft 3 and bore 6. If desired, one or more of the screws may have a smooth neck fitting in said smooth screw holes.

Five of the nine coils 7 of the nine pole systems are shown in FIG. 3. Inter alia with regard to the small slots and spaces the coils 7 are preferably arranged alternatingly on either side of the plane of the air-gap in a staggered relationship, this plane corresponding to the plane of bipartition through the line II—II in FIG. 1, so that if the magnetic head has an even number of pole systems the two halves 1 and 2 are entirely identical and interchangeable even after having been provided with their respective coils 7. Consequently, the whole magnetic head may be composed of two wound halves so that only one type of wound halves is required for each of the halves 1 and 2, in combination with four identical conventional screws 4, the intermediary layer or layers 5 and the shaft 3, whereby the magnetic head may be assembled and mounted in a singularly simple way and requires no further adjustment or touching up with the exception that turning and finishing of the pole surfaces 10*a*, 20*a* is carried out preferably after having assembled the magnetic head. This applies more particularly to polishing such as grinding polishing. Of course, each pole of every pole system may be provided with a coil, if desired.

At least for recording (writing) and reproduction (reading) of digital data at lower speed the eddy currents induced in the magnetic head are fully acceptable even if the core structure 1, 2 is made of simple unalloyed magnetically soft iron which is substantially carbon-free. The eddy currents may be reduced in a conventional manner by using a special low-loss iron, that is iron alloyed with silicon. Besides, the teeth and, if desired, also part of the core structure adjacent to the teeth, may be provided with incisions in a plane parallel to the magnetic axis of the coils 7 (i.e. to the longitudinal axis of the tooth arrays) which plane preferably extends in the direction of movement P of the magnetic tape.

It may be seen from FIG. 3 that the shown magnetic head is adapted to a selected standard width N which is 12.7 mms. (½") in the present case, and that this head may comprise operative pole systems for up to nine magnetic tracks.

The invention makes it possible in a very simple manner to produce, particularly to manufacture in series or in mass, multichannel magnetic heads, each for co-operation with a big number of parallel tracks, one for each pole system of the head. If possible in view of desired magnetic properties, the core structure halves may be produced from strip iron, particularly from section iron having a sectional area substantially as shown in FIG. 1 or a similar section so that the teeth 10, 20 to be formed extend along one of the longitudinal edges of the strip. The profiled section may be produced by rolling, extruding or planing (shaping). Such profile includes the substantially final profile of the teeth, for example as shown in FIG. 1 and a groove or similar impression for the bore 6 to be provided. It may be noted that the figures of the drawing show the magnetic head in a very enlarged scale, approximately 5:1, and the preferred dimensions indicated in the FIGS. 2 and 3 are approximately K=15 mms., L=4 mms., M=23 mms. and N=12.7 mms. The material is soft-magnetic, substantially carbon-free and, preferably, silicon-alloyed strip iron.

According to a first alternative and particularly when producing magnetic heads at a minor scale, the initial material may be a strip of rectangular cross-section of approximately 4–5 mms. x 20–23 mms. none of the dimensions being critical. The teeth 10, 20 and the slots between the teeth extend in the longitudinal direction of the strip. The groove for one half of the bore 6 is milled by contour milling transversely to the strip and may, then be ground. For a square bore, the cross-sectional area of the groove forms a semi-square being rectangular in FIG. 1 or (better) a right-angled isosceles triangle, i.e. a right-angled V-groove. The holes for the screws 4 are drilled, and two diagonally opposite holes of the four holes are threaded, for example with thread M1.7 (metric standard thread 1.7 mms. outer diameter), through the thickness of the strip. The contact surfaces of the two halves of the core structure are ground. Before such processing or after a suitable one of these process steps, the halves 1, 2 are cut from the profiled strip iron. The surfaces to be finished, preferably by grinding and, perhaps, partial polishing, have been mentioned more above. Finally, the tooth array 10 or 20 extends transversely to the longitudinal direction of the strip iron.

According to a second alternative, the two halves are cut from the strip iron such that the tooth arrays 10, 20 extend in the longitudinal direction of the strip, viz along one of the longitudinal edges thereof. In this case, the cross-sectional area of the strip may be lower than in the first alternative case. Assuming the above dimensions of K, L, M and N, the strip may have a cross-section of approximately 15 x 4 or 15 x 5 mms. For mass production, profiled strips, such as profile-rolled strips, of the type described should be used to gain the considerable advantage of eliminating the necessity of roughing or similar primary or basic processes. Also with such method of production wherein the tooth arrays extend along a longitudinal edge of the strip, multiple milling of the teeth is preferred. As in the first alternative described above, a set of circular slitting saws or milling cutters may be used. In the described example of a magnetic head having nine pole systems, said set may consist of ten saw or milling cutters fixedly clamped or connected onto a shaft and spaced by spacers clamped between the cutters.

When using profiled strip material, the process may be limited to the following steps: Milling of the slots between the teeth, drilling of the holes for the screws 4, threading of every second hole, finishing of the bore 6 for shaft 3, fine-grinding and/or polishing of the end surfaces 10*a*, 20*a* of the teeth, and finishing (if required) of the tooth surfaces limiting the air-gap 5. It should be noted that machining of the tooth surfaces, just mentioned, of one or more halves 1, 2 may be made during a single step of operation, possibly during two steps (that is, grinding the surfaces 10*a*, 20*a* and grinding of the walls of the air-gaps 5) whereby the workpiece must be set up once only for this step or for these two steps.

If required, a magnetic head having two diametrically opposite pole system series may be produced wherein the second pole system series is arranged as shown by the dashed lines in FIG. 1.

What I claim is:

1. A head for magnetic recording and reproducing of data comprising two halves of ferromagnetic material, each half being an integral unit and having a flat surface coinciding with a longitudinal plane and a polygonal recess having up to three sides extending longitudinally along the flat surface substantially at the transverse center thereof, means for releasably adjusting and securing the flat surfaces of said two halves together to make electrical contact therebetween, said securing means being disposed on opposite sides of the longitudinal polygonal recess, each half also being provided with a plurality of pole teeth extending outwardly in parallel relation to each other and in parallel spaced relation to the longitudinal plane from at least one side of each half substantially normal to the longitudinal plane, each pole tooth terminating in a curved outer surface and a coil surrounding at least one of said pole teeth whereby when said two halves are secured together the opposed polygonal recesses form a longitudinal bore having up to six sides for securing a rod therein when said flat surfaces are secured in abutting relation and wherein the outer ends of said pole teeth of one half are opposed to the outer ends of said pole teeth of the other half and provide a gap therebetween in the longitudinal plane, the center of curvature of the curved outer surfaces of the pole teeth being the longitudinal axis of said bore.

2. A head as claimed in claim 1 wherein the two halves are identical and are each provided with at least two symmetrically arranged holes therethrough, one of said at least two symmetrical holes being smooth and the other of said at least two holes being threaded, and the means for securing the two halves together comprises at least one pair of opposed screws, each screw passing in opposite direction through one of the smooth holes and engaging one of the threaded holes.

3. A head as claimed in claim 1 wherein alternate pole teeth of each half are provided with coils so that only one pole tooth of an opposed pair of teeth is provided with a coil, all of said coils being in staggered relation along the longitudinal plane.

4. A head as claimed in claim 3 wherein an even number of pole teeth are provided on each half and coils are provided on the same alternating teeth of each half, so that when opposed halves are secured together the staggered relation of the coils along the longitudinal plane is obtained.

References Cited

UNITED STATES PATENTS

| | | | |
|---|---|---|---|
| 2,923,779 | 2/1960 | Namenyi-Katz | 179—100.2 |
| 2,928,907 | 3/1960 | Lubkin | 179—100.2 |
| 3,327,313 | 6/1967 | Oliver | 179—100.2 |
| 3,333,066 | 7/1967 | Studley et al. | 179—100.2 |
| 3,333,322 | 8/1967 | Vrolijks et al. | 179—100.2 |
| 3,349,193 | 10/1967 | Vice | 179—100.2 |

BERNARD KONICK, Primary Examiner

V. P. CANNEY, Assistant Examiner

U.S. Cl. X.R.

179—100.2; 346—74